United States Patent [19]
Montgomery

[11] Patent Number: 5,303,577
[45] Date of Patent: Apr. 19, 1994

[54] METHOD AND APPARATUS FOR DETECTING LEAKS IN LIQUID STORAGE TANKS

[76] Inventor: Joe M. Montgomery, R.R. 22 - Box 355, Springfield, Mo. 65803

[21] Appl. No.: 44,948

[22] Filed: Apr. 9, 1993

[51] Int. Cl.⁵ .............................................. G01M 3/32
[52] U.S. Cl. ....................................... 73/49.2; 73/296
[58] Field of Search ............................... 73/49.2, 296

[56] References Cited

U.S. PATENT DOCUMENTS

| | | | |
|---|---|---|---|
| Re. 31,884 | 5/1985 | Hansel et al. | 73/49.2 |
| 988,342 | 4/1911 | Hillmer | 73/309 |
| 1,864,472 | 6/1932 | Riebeling | 73/864.63 |
| 2,500,348 | 3/1950 | De Giers et al. | 73/296 X |
| 2,634,612 | 4/1953 | Quist | 73/864.63 |
| 3,390,463 | 7/1968 | Hirsch | 73/864.65 X |
| 3,580,055 | 5/1971 | White | 73/49.2 T |
| 3,841,146 | 10/1974 | Cross et al. | 73/49.2 |
| 4,244,218 | 1/1981 | Wohrl | 73/309 |
| 4,281,534 | 8/1981 | Hansel | 73/49.2 |
| 4,594,905 | 6/1986 | Roberts | 73/864.63 |
| 4,646,560 | 3/1987 | Maresca, Jr. et al. | 73/49.2 T |
| 4,739,648 | 4/1988 | Horner | 73/49.2 T |
| 4,813,275 | 3/1989 | Castor | 73/49.2 T |
| 5,035,141 | 7/1991 | Baird et al. | 73/296 |
| 5,132,923 | 7/1992 | Crawford et al. | 73/49.2 T X |

FOREIGN PATENT DOCUMENTS

| | | | |
|---|---|---|---|
| 1298731 | 7/1969 | Fed. Rep. of Germany | 73/296 |
| 1024587 | 6/1983 | U.S.S.R. | 73/296 |

Primary Examiner—Hezron E. Williams
Assistant Examiner—Joseph W. Roskos
Attorney, Agent, or Firm—Senniger, Powers, Leavitt & Roedel

[57] ABSTRACT

A method of detecting a leak in a liquid storage tank utilizes a mass test in which a sample mass of liquid is removed from the storage tank and weighed. After a period of time, another sample mass of liquid, taken at exactly the same location as the first, is removed from the storage tank, and then weighed and compared to the first sample mass to determine whether there is a leak in the storage tank.

10 Claims, 2 Drawing Sheets

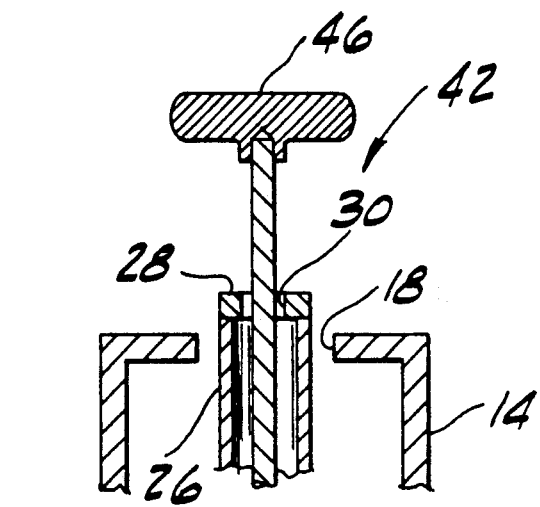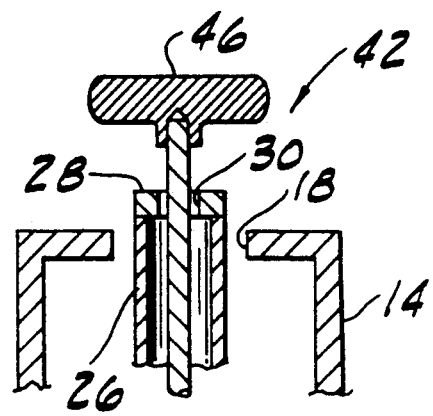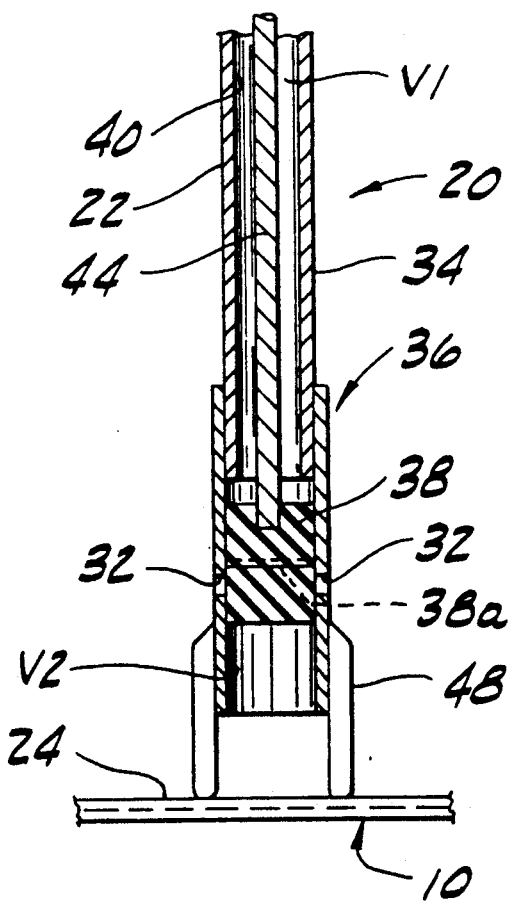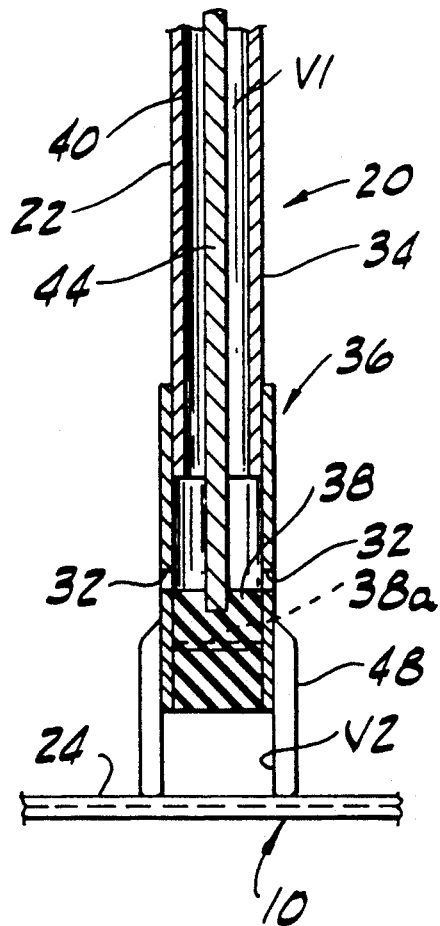
FIG. 2
FIG. 3

METHOD AND APPARATUS FOR DETECTING LEAKS IN LIQUID STORAGE TANKS

BRIEF SUMMARY OF THE INVENTION

This invention relates to a method of detecting a leak in a liquid storage tank and an apparatus for accomplishing the method.

The testing of underground storage tanks for leakage, particularly in storage tanks used to store gasoline at service stations, has become more important recently with the heightened awareness of the potential for damaging the environment. In recent years, the Environmental Protection Agency has made federal regulations in the petroleum industry for all owners and operators of motor fuel underground storage tanks, including requirements for periodic testing the storage tanks for leaks.

Presently, there are several methods for testing the amount of leakage in underground storage tanks. One such method, called the "Petro Tite" test, involves pressurizing the entire underground liquid storage system by introducing a hydrostatic load within the tank and measuring the volumetric change of the liquid in the tank. This method requires, however, compensation for temperature changes which occur in the liquid as well as for tank end deflection and water table. Also, persons conducting the test require considerable training and experience and the necessary equipment is expensive. It can be difficult to adequately circulate the liquid to stabilize product temperature following delivery of product.

Another method locates leaks in the storage tank by depressurizing the tank to below atmospheric and listening for leaks (e.g., air entering the tank) with a highly sensitive microphone. Leaks below liquid level and in the ullage may be separately determined and located. This method can be very time-consuming and has been thought to cause tank failure due to the negative pressure within the tank. In a similar test, the storage tank is pressurized to above atmospheric and microphones listen for escaping air or liquid. Both of these tests require very expensive equipment and skilled operators to carry out.

Still another method, known as a bouyancy or volumetric method is used for testing leakage in storage tanks. One such test using the bouyancy method is disclosed in U.S. Pat. Reissue No. 31,884 to Hansel et al., in which a measuring device detects the volume change in the tank by measuring the change in buoyancy of a float in the tank. This method requires measuring equipment which can support the weight of the float, and yet be highly sensitive to detect small changes in bouyancy. Moreover, the measuring equipment is located outside and is affected by the ambient temperature. Presently, sophisticated software is employed to compensate for the effects of the ambient temperature on the measuring equipment. The cost of all of the equipment needed to accurately conduct the test is beyond the means of small businessmen.

Accordingly, among the several objects and features of the present invention may be noted the provision of a method for detecting a leak in a liquid storage tank which measures mass changes of the liquid in the storage tank rather than volumetric changes of liquid; the provision of such a method which is not sensitive to temperature changes of the liquid in the storage tank which occur during testing; the provision of such a method which can be carried out relatively quickly with no exposure of sensitive equipment to the elements; and the provision of such a method which is easy and economical to perform. Another object of the present invention is the provision of a sampling tube which is simple in design and construction and easy to use.

Generally, a method of detecting a leak in a liquid storage tank such as an underground storage tank for gasoline comprises the steps of: (a) inserting a hollow sampling tube into the liquid in the tank; (b) filling the tube with liquid from the tank until the level of liquid in the tube is substantially equal to the level liquid in the tank; (c) removing the tube from the tank along with a volume of liquid contained in the tube; (d) weighing the volume of liquid from the tube to establish a first reference weight; (e) returning all of the liquid to the tank; (f) reinserting the tube into the liquid in the tank; (g) refilling the tube with liquid from the tank until the level of liquid in the tube is substantially equal to the level of liquid in the tank; (h) removing the tube from the tank along with a volume of liquid contained in the tube; (i) weighing the volume of liquid from the tube to establish a second reference weight; and (j) comparing the first reference weight to the second reference weight to determine whether a change in the amount of liquid in the tank occurred.

A sampling tube for use in detecting a leak in a liquid storage tank such as an underground storage tank for gasoline comprises an elongate, tubular body having a first end and a second end and having inlet means generally adjacent to the second end for admitting liquid from the tank into the body. A valve comprising a valve stop received in the body sealingly slidingly engages interior walls of the body to seal a first volume of the body from a second volume of the body. An actuator is operatively connected to the valve stop and extends from the valve stop to the first end of the body. The actuator is operable to selectively move the valve stop between an open position in which it permits communication between the inlet means and the first volume of the body for filling the first volume with liquid from the tank and a closed position in which the valve stop seals the first volume from said inlet means. Means for engaging the tank establishes a fixed distance the body is inserted into the tank.

Other objects and features will be in part apparent and in part pointed out hereinafter.

BRIEF DESCRIPTION OF THE DRAWINGS

FIG. 2 is a fragmentary vertical section of the sampling tube with a valve of the sampling tube in a closed position; and FIG. 3 is a fragmentary vertical section similar to FIG. 2 with the valve of the sampling tube in an open position.

Corresponding reference characters indicate corresponding parts throughout the several views of the drawings.

DETAILED DESCRIPTION OF THE PREFERRED EMBODIMENTS

Figure 1:
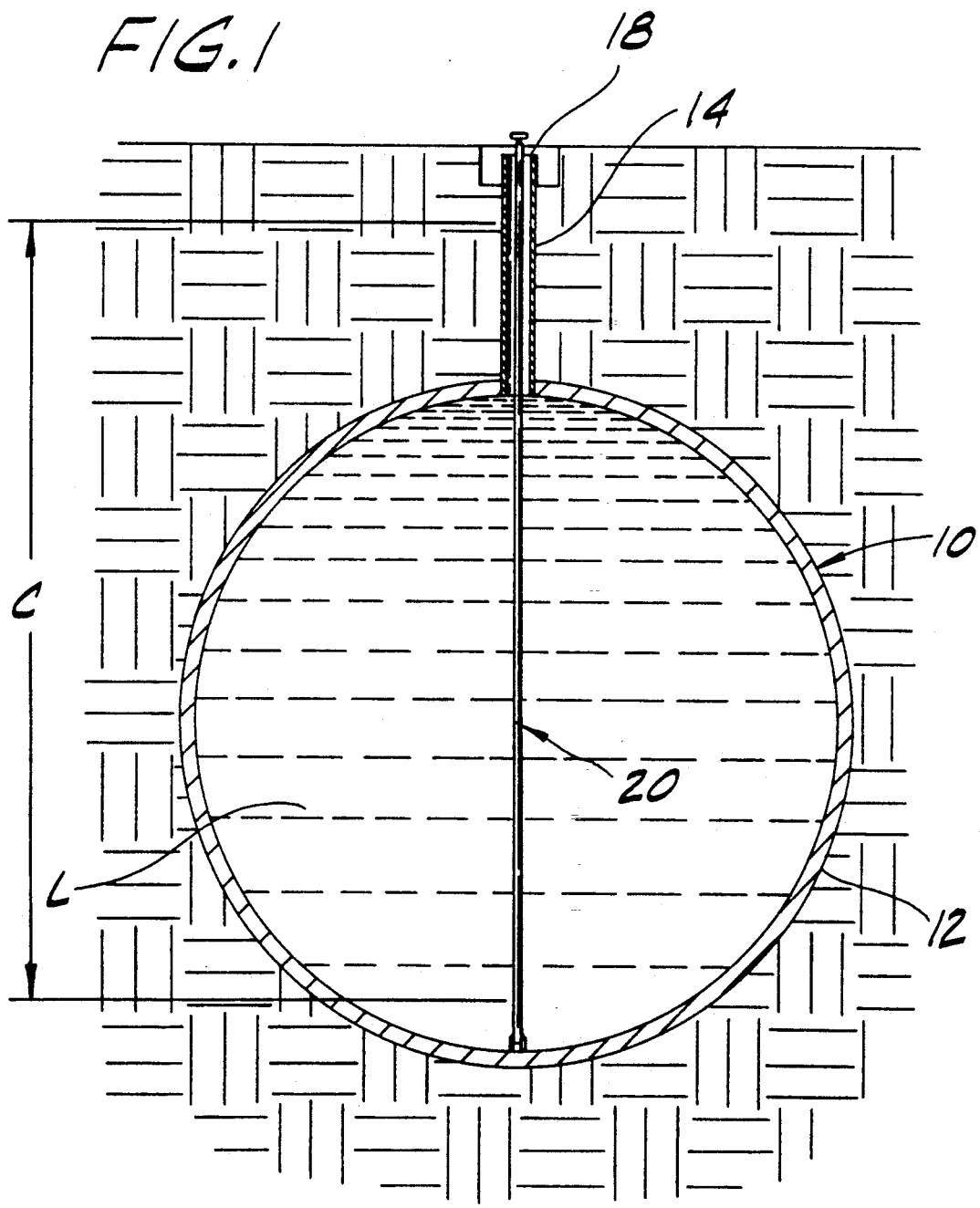
FIG. 1 is a vertical section of an underground liquid storage tank showing a sampling tube inserted into the storage tank.

Referring now to the drawings, and more particularly FIG. 1, there is generally indicated at 10 an underground liquid storage tank for storing liquid L, such as gasoline. As shown, the storage tank 10 includes a body 12 circular in cross section and a vertically disposed neck or fill pipe 14 approximately 4 inches in diameter extending upwardly from the body 12. The fill pipe 14 is accessible above ground for filling the storage tank through an opening 18 defined by the fill pipe. The size of the storage tank is typically anywhere from a relatively small sized tank capable of holding 1,000 gallons to as large as a 12,000 gallon tank. It is to be understood that the method of the present invention is capable of measuring the amount of leakage of a storage tank of any size or shape and is not limited to the underground type of storage tank shown in the drawings.

The method of the present invention provides a simple and accurate way of measuring the amount of leakage in the storage tank 10 not requiring the use of specialized and expensive equipment. Unlike most common existing methods for detecting leaks described above, the method of the present invention utilizes a "pure" mass test (i.e., independent of the volume occupied by the liquid), in which sample masses of liquid are removed from the storage tank 10 and weighed. Each sample mass of liquid is contained within a column C in the storage tank 10 which is located inside a sampling tube 20 and extends from the top level of liquid in the fill pipe 14 down to near the bottom of the tank. Each sample mass of liquid is taken from the same column C. Of course, the height of the column may change from sample to sample because of changes in temperature of the liquid or because of losses or gains in liquid caused by leaks in the tank. However, the mass of liquid in the column will not change unless there is a change in the amount of liquid in the tank. Accordingly, the method of the present invention can quickly and accurately detect leaks in the tank 10 without the need to compensate for temperature changes.

The sampling tube 20 used to remove the sample masses of liquid has an elongate tubular body 22 with a circular cross-sectional area. The body 22 of the tube 20 is approximately ¾ inch in diameter in the illustrated embodiment and is made from stainless steel polished smooth so that the liquid L from the storage tank 10 does not adhere to the body when the tube is removed from the liquid. The tube 20 is long enough so that it reaches the bottom 24 of the storage tank 10 and extends above the fill pipe 14. The upper end 26 of the sampling tube 20, constituting its first end, is capped with a plate 28 having an opening 30 therein. Two laterally outwardly opening holes or inlets 32 located at radially opposite positions are located near the lower end 34 of the sampling tube 20, which constitutes a second end of the body 22 of the tube. Inlets 32 admit liquid L from the storage tank 10 into the body 22 of the tube 20. A valve generally indicated at 36 is located within the body 22 of the tube 20 near the lower end 34 of the tube for selectively opening the inlets 32 at the same time. The valve 36 comprises a valve stop 38 received in the body 22 of the tube 20 for sealingly slidingly engaging interior walls 40 of the body 22 to seal a first volume V1 of the body 22 above the valve stop 38 from a second volume V2 of the body 22 below the valve stop 38. An O-ring 38a is provided in a groove (not shown) in the valve stop 38 for sealing the first volume V1 from the second volume V2.

An actuator generally indicated at 42 is operatively connected to the valve stop 38 and extends from the valve stop to the upper end 26 of the tube 20. The actuator 42 includes a rod 44 connected at its lower end to the valve stop 38. The rod 44 extends axially out the upper end 26 of the tube 20 through the opening 30 in the plate 28. A handle 46 is provided at the upper end of the rod 44 opposite the valve stop 38 for gripping and for sliding the valve stop 38 upwards or downwards axially within the body 22 of the tube 20. The opening 30 in the plate 28 has a larger diameter than the diameter of the rod 44 to provide a space between the rod and the body 22 for venting air and other gasses from the body 22 as it is filled with liquid L from the tank 10. Thus, the liquid entering the tube 20 will seek the level of the liquid L in the tank 10.

As shown in FIGS. 2 and 3, the actuator 42 is operable to selectively move the valve stop 38 between an open position in which it permits communication between the inlets 32 and the first volume V1 of the body 22 above the valve stop 38 for filling the first volume V1 with liquid L from the storage tank 10, and a closed position in which the valve stop 38 seals the first volume V1 from the inlets 32. FIG. 2 illustrates the valve stop 38 in a closed position blocking the inlets 32 and FIG. 3 illustrates the valve stop 38 below the inlets 32 in an open position. By gripping the handle 46 and moving the actuator 42 downward, the valve stop 38 axially moves to its open position so that liquid L from the storage tank 10 fills the first volume V1 (i.e., the column C) above the valve stop 38. It is to be understood that the valve stops 38 may take other forms than illustrated in the drawings and still fall within the scope of the present invention. For instance, instead of the plunger form of valve stop shown, the valve stop could also be a ball (not shown) which is rotated between opened and closed positions.

A pair of legs 48 are mounted on the lower end 34 of the tube 20 for engaging the bottom 24 of the storage tank 10 to establish a fixed distance the body 22 is inserted into the storage tank. Each time the sampling tube 20 is inserted into the liquid L in the storage tank 10, it must be inserted into the tank at a consistent predetermined depth in order to ensure that samples are taken from an identical column of liquid. The legs 48 are preferably tapered at their lower ends so that the legs can push aside any debris at the bottom 28 of the tank 10 and engage the tank wall generally opposite the opening 18 defined by the filling tube 14 when the sampling tube is inserted. Thus, consistent samples may be obtained since the sampling tube 20 is positioned at the same location in the tank 10 for each sample. It is to be understood that other mechanisms may be employed to ensure that the sampling tube 20 is inserted a constant depth into the tank 10 and still fall within the scope of the present invention. Further, it is not necessary for the sampling tube 20 to extend to the bottom of the tank so long as it inserted a consistent depth into the tank.

Before inserting the sampling tube 20 into the storage tank 10, the storage tank should preferably be filled substantially into the fill pipe 14. A predetermined period of time (e.g., one hour) is permitted to pass so that the temperature of the liquid in the tank becomes substantially uniform. It is believed that the test of the present invention could be used even if the liquid level is below the fill pipe. However, a sampling tube having a larger diameter than the tube 20 used in the preferred embodiment would be needed in order to detect changes in the mass of liquid in the tank, because the mass loss reflected in the column C of liquid in the sampling tube is only a fraction of the total mass loss in the tank. However, measurements conducted when the liquid level is below the fill pipe 14 would be useful for providing more information about the location of any leak detected.

The sampling tube 20 is inserted into the liquid L contained in the storage tank 10 until the legs 48 engage the bottom 24 of the tank 10 and the body 22 of the sampling tube 20 is at a predetermined depth. To help ensure that the tube 20 occupies substantially the same space in the tank 10 every time it is inserted, the tube may be held against a section of the internal surface of the fill pipe. The tube 20 is filled with liquid L from the tank 10 by opening the valve 36 on the sampling tube 20 to permit entry of liquid L from the storage tank 10 into the tube 20 until the level of liquid L in the tube 20 is substantially equal to the level liquid L in the tank 10. The valve 36 is then moved to seal the liquid in the sampling tube from the inlets 32. The sampling tube 20 is next removed from the tank 10 along with a volume (and accordingly, a mass) of liquid contained in the tube 20. The volume of liquid in the sampling tube 20 is removed from the tube into a flask (not shown). The flask and the liquid are weighed with a gram equivalent electronic scale (not shown) or other appropriate weighing apparatus to determine a first reference weight. The weighing may be carried out inside a truck, where the scales are protected from the weather, including particularly temperature extremes. Thus, the present method does not require any sensitive equipment which must be exposed to the elements.

After establishing the first reference weight of the sample, a procedure may be carried out to establish a predetermined failure rate and a mass to volume conversion ratio. To that end, a predetermined first standard of volume of liquid from the volume of liquid weighed is drained off into a second flask (not shown), thereby creating a known "leak" in the tank. The preferred amount of liquid to be drained is 0.050 gallon because EPA regulations specify that a loss of 0.050 gallons or more from the tank in a 1 hour period is a failing test result. The remaining liquid from the first flask (i.e., the total amount removed from the tank 10 in the sampling tube 20 less the 0.050 gallon) is returned to the storage tank 10.

The sampling tube 20 is reinserted into the liquid L contained in the tank 10 without substantial delay after the remaining liquid in the first flask is returned to the tank. The valve 36 of the sampling tube 20 is opened to permit entry of liquid L from the tank 10 into the tube which is refilled until the level of liquid in the tube is substantially equal to the liquid level in the tank 10. The sampling tube 20 is removed from the storage tank 10 along with a volume of liquid contained in the tube. The volume of liquid is removed from the sampling tube 20 into the first flask and weighed to establish an intermediate reference weight. The first reference weight is compared to the intermediate reference weight, and should establish that the intermediate reference weight is less than the first reference weight.

This procedure sets a mass standard by which the tank can be either passed or failed, when the volume drained off is equal to the maximum change in liquid permitted (e.g., 0.050 gallon under the EPA standard). Therefore, it is immediately known after weighing a subsequent sample from the tank (as described more fully below) whether the tank 10 is sufficiently liquid tight by comparing the difference between the weight of the subsequent sample and the first reference weight to the difference between the first reference weight and the intermediate reference weight. If the difference in weight between the subsequent sample and the first reference weight is greater than the difference between the first reference weight and the intermediate reference weight, then the tank fails the test. It is possible that the subsequent sample may weigh more than the first reference weight. In standard testing, the tank passes so long as the subsequent sample differs in weight from the first reference weight no more than plus or minus the established mass standard.

In addition, the first standard volume and the difference between the first reference weight and the intermediate reference weight establish a ratio of volume to weight which can be used to convert changes in the amount of liquid in the tank expressed in terms of weight, to differences expressed in terms of volume. For example, if the established difference between the first reference weight and the intermediate reference weight is 18 grams, it is known that a loss of 0.050 gallon from the entire volume of the tank is reflected by a weight differential of 18 grams between samples collected by the sampling tube 20. Therefore, if a subsequent sample has a weight of 24 grams less than the first reference weight it is known that the corresponding total volume loss in the tank is 0.067 gallon.

All of the liquid is then returned to the storage tank 10, including the predetermined first standard volume of liquid, and after waiting a predetermined period of time, the sampling tube 20 is reinserted into the liquid L in the tank 10. Typically, the predetermined period of time is one hour, since the flow rate of the leak is usually reported in gallons of fluid leaked per hour. The sampling tube 20 is refilled by opening the valve 36 on the sampling tube 20 to permit entry of liquid L from the storage tank 10 into the tube 20 until the level of liquid in the tube 20 is substantially equal to the level of liquid in the tank 10. The tube 20 is then removed from the tank 10 along with a volume of liquid contained in the tube 20. The liquid is drained from the sampling tube 20 into the flask and the volume of the liquid from the tube 20 is weighed to establish a second reference weight. The change in the amount of liquid is determined by finding the difference between the first reference weight and the second reference weight. This weight may be converted to volume by multiplying it by the ratio of the first standard volume (e.g., 0.050 gallon) over the difference between the first reference weight and the intermediate reference weight. The leak rate of the liquid is determined by dividing the lost volume of liquid by the predetermined period of time which elapsed between taking samples.

The expression of the leak rate for the tank 10 in terms of weight is the most accurate determination of the amount of liquid being lost. A volumetrically expressed leak rate is not as accurate, because it will reflect a different amount of liquid being lost at different temperatures. However, regulations require the leak rate to be reported in terms of lost volume of liquid per hour rather than lost mass or weight of liquid per hour. Accordingly, by multiplying the difference between the first reference weight and the intermediate reference weight by the volume conversion ratio, a lost volume of liquid may be determined. At this point, the procedure used to establish the mass of volume conversion ratio may be repeated in order to confirm the accuracy of the ratio. The steps of the confirmation procedure are the same as described above and should establish a substantially identical mass of volume conversion ratio.

In view of the above, it will be seen that the several objects of the invention are achieved and other advantageous results attained.

As various changes could be made in the above constructions without departing from the scope of the invention, it is intended that all matter contained in the above description as shown in the accompanying drawing shall be interpreted as illustrative and not in a limiting sense.

What is claimed is:

1. A method of detecting a leak in a liquid storage tank such as an underground storage tank for gasoline, the method comprising the steps of:
    inserting a hollow sampling tube into the liquid in the tank;
    filling the tube with liquid from the tank until the level of liquid in the tube is substantially equal to the level liquid in the tank;
    removing the tube from the tank along with a volume of liquid contained in the tube;
    weighing the volume of liquid from the tube to establish a first reference weight;
    returning all of the liquid to the tank;
    reinserting the tube into the liquid in the tank;
    refilling the tube with liquid from the tank until the level of liquid in the tube is substantially equal to the level of liquid in the tank;
    removing the tube from the tank along with a volume of liquid contained in the tube;
    weighing the volume of liquid from the tube to establish a second reference weight;
    comparing the first reference weight to the second reference weight to determine whether a change in the amount of liquid in the tank occurred.

2. A method as set forth in claim 1 wherein the step of inserting the hollow sampling tube into the liquid in the tank comprises the step of inserting the hollowing sampling tube into the tank to a predetermined depth, and wherein the step of reinserting the tube into the tank comprises the step of reinserting the tube into the tank to said predetermined depth.

3. A method as set forth in claim 2 wherein the step of inserting the hollow sampling tube into the tank to a predetermined depth comprises the step of inserting the hollow sampling tube into the tank through an opening therein until a lower end of the tube engages the tank generally opposite the opening, and wherein the step of reinserting the tube into the tank to a predetermined depth comprises the step of reinserting the tube into the tank through the opening therein until the lower end of the tube engages the tank generally opposite the opening.

4. A method as set forth in claim 3 further comprising, following the step of weighing the liquid in the tube to establish a first reference weight, the steps of:
    draining off a predetermined first standard volume of liquid from the volume of liquid weighed, said first standard volume being substantially equal to a predetermined volume change selected as the standard for failing the tank;
    returning the remaining liquid from the volume of liquid weighed to the tank;
    reinserting the tube into the liquid in the tank through the opening until the lower end of the tube engages the tank generally opposite the opening;
    refilling the tube with liquid from the tank until the level of liquid in the tube is substantially equal to the level liquid in the tank;
    removing the tube from the tank along with a volume of liquid contained in the tube;
    weighing the volume of liquid from the tube to establish an intermediate reference weight; and
    comparing the first reference weight to the intermediate weight to establish a mass based tank failure value.

5. A method as set forth in claim 4 wherein the steps of filling and refilling the sampling tube each comprise the step of opening a valve on the sample tube to permit entry of liquid from the tank into the tube.

6. A method as set forth in claim 1 further comprising, prior to the step of inserting the sampling tube into the tank, the step of filling the tank with liquid into a neck portion of the tank.

7. A method of detecting a leak in a liquid storage tank such as an underground storage tank for gasoline comprising the steps of:
    (a) inserting a hollow sampling tube into the liquid in the tank;
    (b) filling the tube with liquid from the tank until the level of liquid in the tube is substantially equal to the level liquid in the tank;
    (c) removing the tube from the tank along with a volume of liquid contained in the tube;
    (d) weighing the volume of liquid in the tube to establish a first reference weight;
    (e) draining off a predetermined first standard volume of liquid from the volume of liquid weighed, said first standard volume being substantially equal to a predetermined volume change selected as the standard for failing the tank;
    (f) returning the remaining liquid from the volume of liquid weighed to the tank;
    (g) reinserting the tube into the liquid in the tank;
    (h) refilling the tube with liquid from the tank until the level of liquid in the tube is substantially equal to the level liquid in the tank;
    (i) removing the tube from the tank along with a volume of liquid contained in the tube;
    (j) weighing the volume of liquid to establish an intermediate reference weight;
    (k) comparing the first reference weight to the intermediate weight to establish a mass based tank failure value;
    (l) returning all of the liquid to the tank;
    (m) repeating steps (a)–(l) if the intermediate reference weight is not less than the weight of the first reference weight;
    (n) reinserting the tube into the liquid in the tank;
    (o) refilling the tube with liquid from the tank until the level of liquid in the tube is substantially equal to the level of liquid in the tank;
    (p) removing the tube from the tank along with a volume of liquid contained in the tube;
    (q) weighing the volume of liquid to establish a second reference weight;
    (r) comparing the first reference weight to the second reference weight to determine whether a change in the amount of liquid in the tank has occurred.

8. A method as set forth in claim 7 wherein the step of inserting the hollow sampling tube into the liquid in the tank comprises the step of inserting the hollowing sampling tube into the tank to a predetermined depth, and wherein the step of reinserting the tube into the tank comprises the step of reinserting the tube into the tank to said predetermined depth.

9. A method as set forth in claim 7 wherein the steps of filling and refilling the sampling tube each comprise the step of opening a valve on the sample tube to permit entry of liquid from the tank into the tube.

10. A method as set forth in claim 7 further comprising, prior to the step of inserting the sampling tube into the tank, the step of filling the tank with liquid into a neck portion of the tank.

* * * * *